(12) United States Patent
Jeong et al.

(10) Patent No.: US 8,050,221 B2
(45) Date of Patent: Nov. 1, 2011

(54) METHOD AND APPARATUS FOR DISPERSING USER EQUIPMENTS TO NON-PREFERRED FREQUENCIES IN A MULTIMEDIA BROADCAST/MULTICAST SERVICE SYSTEM

(75) Inventors: Kyeong-In Jeong, Suwon-si (KR); Kook-Heui Lee, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1418 days.

(21) Appl. No.: 11/346,562

(22) Filed: Feb. 3, 2006

(65) Prior Publication Data
US 2006/0182058 A1 Aug. 17, 2006

(30) Foreign Application Priority Data

Feb. 4, 2005 (KR) .................. 10-2005-0010869
Feb. 15, 2005 (KR) .................. 10-2005-0012508

(51) Int. Cl.
*H04W 4/00* (2009.01)
*H04W 72/00* (2009.01)
*H04B 7/00* (2006.01)
*H04N 7/16* (2006.01)
*G06F 15/16* (2006.01)

(52) U.S. Cl. ........ 370/329; 370/328; 370/340; 370/341; 370/312; 455/414.1; 455/450; 455/526; 455/454; 725/62; 709/227; 709/228; 709/229

(58) Field of Classification Search ......... 370/329–330, 370/340, 341, 312; 455/414.1, 450, 454, 455/526; 725/62; 709/227, 228, 229
See application file for complete search history.

(56) References Cited

U.S. PATENT DOCUMENTS

| | | | | |
|---|---|---|---|---|
| 6,449,323 | B1* | 9/2002 | Suzuki | 375/340 |
| 7,546,132 | B2* | 6/2009 | Lee et al. | 455/503 |
| 7,602,802 | B2* | 10/2009 | Kim | 370/432 |
| 7,636,332 | B2* | 12/2009 | Kwak et al. | 370/329 |
| 2002/0051431 | A1* | 5/2002 | Choi et al. | 370/331 |
| 2002/0111166 | A1* | 8/2002 | Monroe | 455/435 |

(Continued)

FOREIGN PATENT DOCUMENTS

EP 1 006 740 A2 6/2000

(Continued)

OTHER PUBLICATIONS

Universal Mobile Telecommunications System (UMTS); Introduction of Multimedia Broadcast/Multicast Service (MBMS) in the Radio Access Network (RAN); Stage 2 (3GPP TS 25.346 version 6.1.0 Release 6); vol. 3-R, No. V610, Jun. 2004.

*Primary Examiner* — Rafael Pérez-Gutiérrez
*Assistant Examiner* — Allahyar Kasraian
(74) *Attorney, Agent, or Firm* — Roylance, Abrams, Berdo & Goodman, LLP

(57) ABSTRACT

A method and apparatus for dispersing user equipments (UEs) to non-preferred frequencies in a multimedia broadcast/multicast service (MEMS) system is provided. Information regarding a time required until a next session of the MBMS service is started is received. A determination is made as to whether to set a layer dispersion indicator (LDI) in a session stop message, according to the time required until the next session is started. The determined session stop message is sent to the UEs.

18 Claims, 5 Drawing Sheets

U.S. PATENT DOCUMENTS

| | | | |
|---|---|---|---|
| 2003/0022683 A1* | 1/2003 | Beckmann et al. | 455/518 |
| 2003/0114177 A1 | 6/2003 | Sinnarajah et al. | 455/515 |
| 2004/0105402 A1* | 6/2004 | Yi et al. | 370/312 |
| 2004/0147266 A1* | 7/2004 | Hwang et al. | 455/445 |
| 2004/0228294 A1* | 11/2004 | Kim et al. | 370/312 |
| 2004/0229626 A1* | 11/2004 | Yi et al. | 455/450 |
| 2005/0007971 A1* | 1/2005 | Jeong et al. | 370/312 |
| 2005/0026597 A1* | 2/2005 | Kim et al. | 455/412.1 |
| 2005/0090278 A1* | 4/2005 | Jeong et al. | 455/525 |
| 2005/0096017 A1* | 5/2005 | Kim | 455/414.1 |
| 2005/0185620 A1* | 8/2005 | Lee et al. | 370/331 |
| 2005/0201321 A1* | 9/2005 | Sinnarajah et al. | 370/328 |
| 2005/0273833 A1* | 12/2005 | Soinio | 725/113 |
| 2006/0056347 A1* | 3/2006 | Kwak et al. | 370/329 |
| 2006/0107287 A1* | 5/2006 | Lee et al. | 725/32 |
| 2006/0252430 A1* | 11/2006 | Barreto et al. | 455/450 |
| 2007/0015530 A1* | 1/2007 | Ding | 455/525 |

FOREIGN PATENT DOCUMENTS

| | | |
|---|---|---|
| KR | 1020030037821 A | 5/2003 |
| KR | 1020050107968 A | 11/2005 |
| KR | 1020060010682 A | 2/2006 |
| KR | 1020060024756 A | 3/2006 |

* cited by examiner

METHOD AND APPARATUS FOR DISPERSING USER EQUIPMENTS TO NON-PREFERRED FREQUENCIES IN A MULTIMEDIA BROADCAST/MULTICAST SERVICE SYSTEM

PRIORITY

This application claims the benefit under 35 U.S.C. §119 (a) of two Korean Patent Applications entitled "Method and Apparatus for Dispersing User Equipments to Non-Preferred Frequencies in a Multimedia Broadcast/Multicast Service System" filed in the Korean Intellectual Property Office on Feb. 4, 2005 and Feb. 15, 2005 and assigned Serial Nos. 2005-10869 and 2005-12508, the entire disclosures both of which are hereby incorporated by reference.

BACKGROUND OF THE INVENTION

1. Field of the Invention

The present invention relates to a multimedia broadcast/multicast service (MBMS) system. More particularly, the present invention relates to a method and apparatus for dispersing user equipments (UEs) to non-preferred frequencies using time information for session start notification in a MBMS system.

2. Description of the Related Art

With developments of various communication technologies, mobile communication systems using a wideband code division multiple access (CDMA) scheme are developing into systems for multimedia broadcast/communication capable of providing a conventional voice service, as well as a multimedia service and a packet communication service for transmitting large amounts of data. To support the multimedia broadcast/communication, MBMS service provided from one or more multimedia data sources to a plurality of user equipments (UEs) is being implemented.

The term "MBMS service" refers to a service for transmitting through a wireless network the same multimedia data to a plurality of receivers. As a result, radio transmission resources can be efficiently used because the receivers share one radio channel. The MBMS service supports the transmission of multimedia, such as, realtime video and voice, still images, text, and the like. The MBMS service, which requires a large amount of resources for transmission, simultaneously transmits voice data and video data according to a type of multimedia transmission. Because an MBMS service must transmit the same data to a plurality of cells in which users are located, a Point-to-Point (PtP) or Point-to-Multipoint (PtM) connection is made according to the number of users located in each cell.

Recent MBMS systems are supporting frequency layer convergence (FLC) technology for allocating a preferred frequency for each of the MBMS services provided, and allowing UEs to receive desired MBMS services in a preferred frequency layer (PL). FLC information indicates preferred frequencies mapped to MBMS services. MBMS FLC is a method for moving UEs to a preferred frequency for each service such that one service can be provided at only one frequency, rather than all frequencies overlapped in an identical area.

FIG. 1 illustrates a conventional structure of cell layers overlapped in an identical service area and an example of MBMS FLC.

FIG. 1 illustrates a cell structure in which different frequencies, that is, Frequency 1, Frequency 2, Frequency 3, and Frequency 4, are overlapped in an identical area. Reference numerals 101, 111, 121, and 131 comprise Frequency 1, Frequency 2, Frequency 3, and Frequency 4, respectively. Reference numeral 141 comprises a controlling radio network controller (CRNC) for controlling cells of the frequencies. FLC is a method for moving UEs to a preferred frequency for each service such that each service can be provided at only one frequency, without providing one service from all cells of Frequency 1, Frequency 2, Frequency 3, and Frequency 4 overlapped in an identical area, as illustrated in FIG. 1.

In FIG. 1, the CRNC 141 receives a session start message, which notifies that a specific MBMS session will be started from a serving General Packet Radio Service (GPRS) support node (SGSN) (not illustrated) over an Iu interface in Process 1. When receiving the session start message, the CRNC 141 selects a preferred frequency for an MBMS service in Process 2. In FIG. 1, an assumption is made that Frequency-2 111 has been selected as the preferred frequency for the service session. In Process 3, information of Preferred Frequency-2 111, for the MBMS service selected in Process 2, is sent to cells of all frequencies, that is, Frequency-1 101, Frequency-2 111, Frequency-3 121, and Frequency-4 131.

Among the UEs requesting to receive the MBMS service session after receiving the preferred frequency information, UEs at non-preferred frequencies 101, 121, and 131 move to the preferred frequency 111 in Process 4. The UEs at the preferred frequency 111 continuously remain at the preferred frequency 111. The above-described Process 4 is referred to as the FLC. The UEs requesting to receive the service session, according to the FLC, concentrates at the preferred frequency 111.

When the session ends, as described with reference to FIG. 1, the UEs concentrated at the preferred frequency 111 need to be dispersed to many different frequencies.

Accordingly, there is a need for an improved method and apparatus that disperses the UEs, which are concentrated at a preferred frequency, to many different frequencies in a MBMS system.

SUMMARY OF THE INVENTION

An aspect of embodiments of the present invention is to address at least the above problems and/or disadvantages and to provide at least the advantages described below. Accordingly, an aspect of embodiments of the present invention is to provide a method and apparatus for including, in a session stop message, information about a time required until the next session of a multimedia broadcast/multicast service (MBMS) service is started so user equipments (UEs), without a dedicated channel for receiving the MBMS service having a preferred frequency, can be efficiently dispersed to different frequencies when a session is ended.

Moreover, the present invention provides a method and apparatus for preventing user equipments (UEs) concentrated at a preferred frequency for a session from being unnecessarily dispersed to different frequencies when a specific multimedia broadcast/multicast service (MBMS) session having the preferred frequency is ended.

Moreover, the present invention provides a method and apparatus for defining a time information parameter, associated with a time required until the next session is started, being transmitted in a session stop message and performing an operation according to the parameter in a controlling radio network controller (CRNC).

In accordance with an aspect of an exemplary embodiment of the present invention, there is provided a method for dispersing user equipments (UEs) to non-preferred frequencies in a multimedia broadcast/multicast service (MBMS) system, comprising receiving information about a time required until a next session of a MBMS service is started, determining whether to set a layer dispersion indicator (LDI) in a session stop message, according to the time required, until the next session is started; and sending the determined session stop message to the UEs In accordance with another aspect of an exemplary embodiment of the present invention, there is provided an apparatus for dispersing user equipments (UEs) to non-preferred frequencies in a multimedia broadcast/multicast service (MBMS) system, comprising a broadcast multicast service center (BM-SC) for providing an MBMS service, including information about a time, required until a next session of the MBMS service is started, in a first message when a session of the MBMS service is ended, and sending the first message over a specific interface. A radio network controller (RNC) controls a plurality of cells, receives the first message, when the MBMS service has a preferred frequency, detects information regarding the time, required until the next session is started, and determines whether to set a layer dispersion indicator (LDI) in a session stop message, sending the session stop message to the UEs for receiving the MBMS service according to the detected information.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matter defined in the description such as a detailed construction and elements are provided to assist in a comprehensive understanding of the embodiments of the invention. Accordingly, those of ordinary skill in the art will recognize that various changes and modification of the embodiments described herein can be made without departing from the scope and spirit of the invention. Also, descriptions of well-known functions and constructions are omitted for clarity and conciseness.

Figure 1:
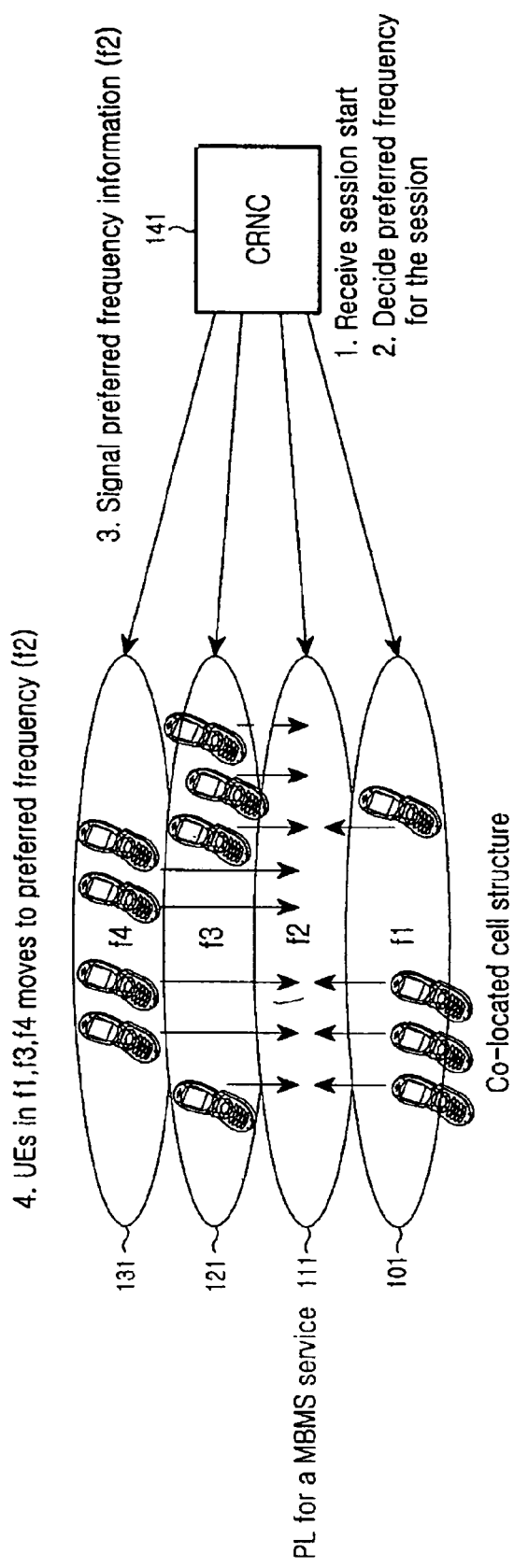
FIG. 1 illustrates a conventional structure of cell layers overlapped in a service area and an example of multimedia broadcast/multicast service (MBMS) frequency layer convergence (FLC)
Figure 2:
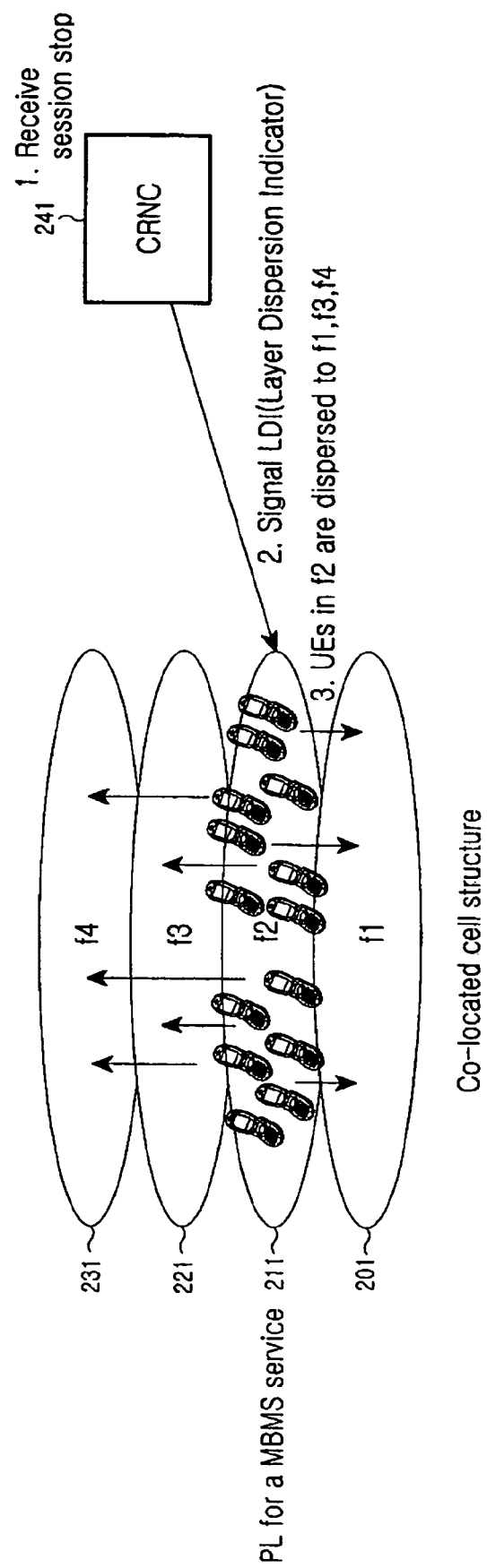
FIG. 2 illustrates an example of using a conventional MBMS layer dispersion indicator (LDI)

FIG. 2 illustrates an example of using a conventional multimedia broadcast/multicast service (MBMS) layer dispersion indicator (LDI). The LDI is used in a method for dispersing, to different frequencies, user equipments (UEs) concentrated at a preferred frequency for an MBMS service according to frequency layer convergence (FLC) described with reference to FIG. 1, when a session is ended.

In FIG. 2, reference numerals 201, 211, 221, and 231 comprise Frequency 1, Frequency 2, Frequency 3, and Frequency 4, respectively, overlapped in an identical service area. Reference numeral 241 comprises a controlling radio network controller (CRNC) for controlling cells of the frequencies. In Process 1, the CRNC 241 receives a session stop message, which notifies that a specific MBMS session has ended from a serving GPRS support node (SGSN) (not illustrated) over an Iu interface. In FIG. 2, an assumption is made that Frequency-2 211 has been used as a preferred frequency for a specific MBMS session.

In Process 2, the CRNC 241 signals an LDI upon receiving the session stop message. The LDI is sent an MBMS control channel (MCCH). In Process 3, the UEs concentrated at the preferred frequency 211 determine that they no longer need to concentrate at the preferred frequency 211 for the MBMS service session because the session has been ended. As a result, the UEs are dispersed to the different frequencies 201, 221, and 231. At this time, the dispersion method can enable the UEs to move to a cell of a predefined maximum radio strength being selected, or to employ a special dispersion mechanism.

Figure 3:
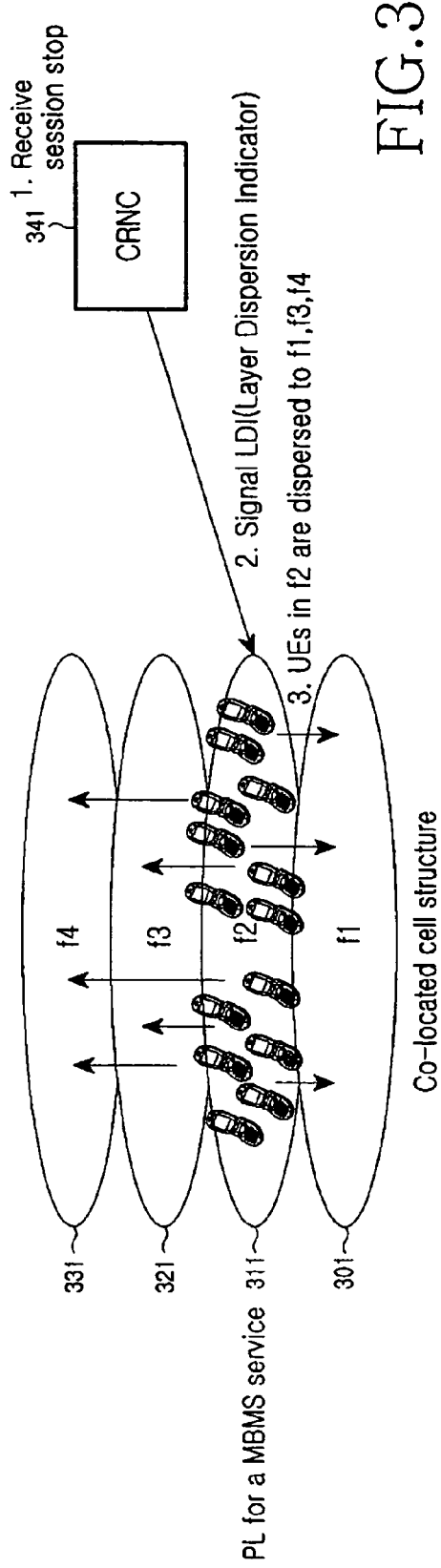
FIG. 3 illustrates a problem according to use of the conventional MBMS LDI.
Figure 3:
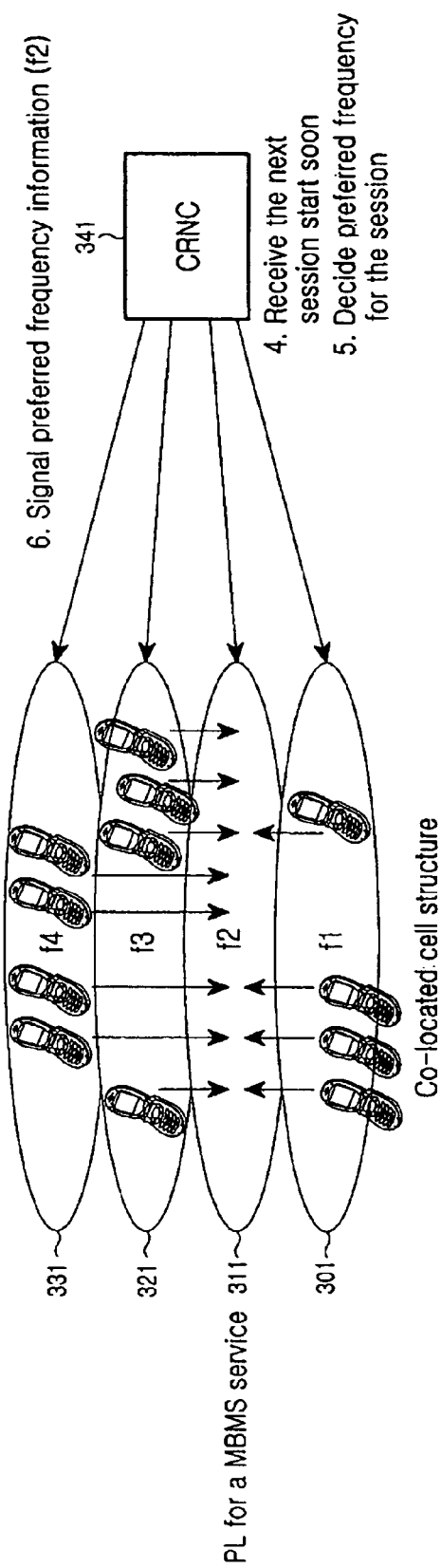

FIG. 3 illustrates a problem that exists when the FLC and LDI are used as illustrated in FIGS. 1 and 2.

In FIG. 3, reference numerals 301, 311, 321, and 331 comprise Frequency 1, Frequency 2, Frequency 3, and Frequency 4, respectively, overlapped in an identical service area. Reference numeral 341 comprises a CRNC for controlling cells of the frequencies. FIG. 3 illustrates a consecutive procedure from a session stop operation for a specific MBMS session, having a preferred frequency, to the next service session start operation. Only the next session start occurs in a relatively short time after the previous session stops.

In Process 1, the CRNC 341 receives, from an SGSN (not illustrated), a session stop message, which notifies that a specific MBMS session of Frequency-2 311, serving as the preferred frequency, has ended. In Process 2, the CRNC 341 signals an LDI. In Process 3, UEs concentrated at the preferred frequency 311 for the service session receive the LDI and are dispersed to the different frequencies 301, 321, and 331.

In Process 4, the CRNC 341 receives a message indicating the next service session starts within a relatively short time. In Process 5, the CRNC 341 selects the preferred frequency 311 for the next service session. In Processes 6 and 7, the UEs dispersed to the different frequencies 301, 321, and 331, in Processes 2 and 3, must concentrate at the preferred frequency 311. When time between the previous session stop of Process 1 and the next session start of Process 4 is insufficient, a procedure for dispersing the UEs to the different frequencies in Processes 2 and 3 is inessential. If the UEs must concentrate again at the preferred frequency in a state which the UEs have been dispersed when the next session is soon started, the UEs must perform measurement, cell re-selection, and uplink/downlink signaling, according to the procedure for dispersing the UEs from the preferred frequency to different frequencies.

When an LDI is signaled without considering a time between a specific MBMS service session stop time, associated with the preferred frequency, and the next service session start time in FIG. 3, measurement, cell re-selection, and uplink/downlink signaling, may be unnecessarily performed according to the procedure for dispersing the UEs from the preferred frequency to different frequencies when the next session is soon started and enabling the UEs to concentrate at the preferred frequency.

Therefore, exemplary implementations of the present invention may prevent the UEs, concentrated at an identical preferred frequency for a session, from being necessarily dispersed to different frequencies when the next session is started immediately after a specific MBMS session having a preferred frequency is ended.

Figure 4:
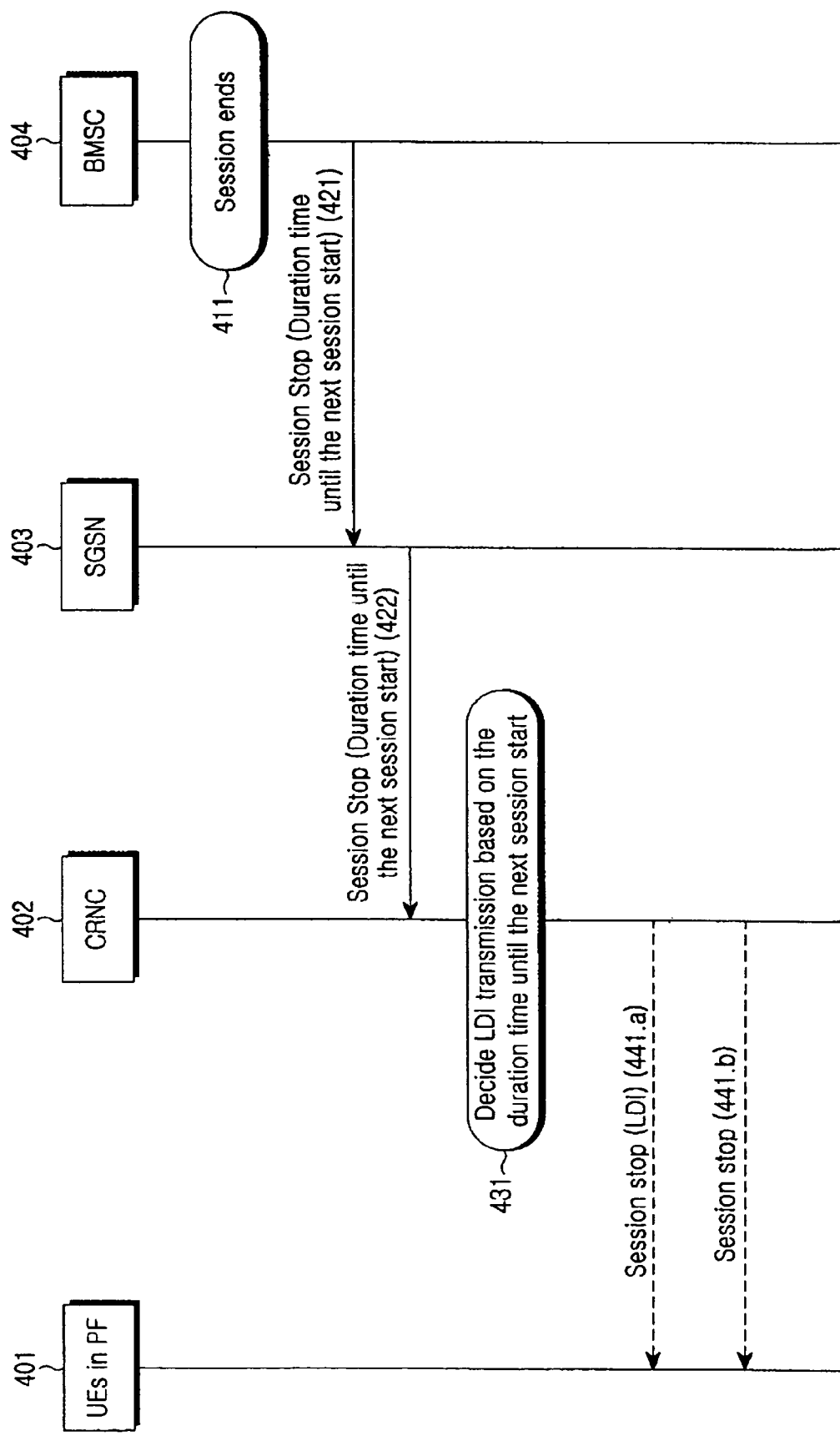
FIG. 4 illustrates a method based on the MBMS LDI in accordance with an exemplary embodiment of the present invention.

FIG. 4 illustrates an operation for signaling an MBMS LDI, in accordance with an exemplary embodiment of the present invention, in order to solve the problem occurring in FIG. 3.

Reference numeral 401 comprises UEs for receiving a service of a specific MBMS session from a cell of a preferred frequency (PF). Reference numeral 402 comprises a CRNC for controlling the cell of the preferred frequency in which the UEs 401 are located. Reference numeral 403 denotes an SGSN connected to the CRNC 402. Reference numeral 404 comprises a broadcast multicast service center (BM-SC) 404 for providing the MBMS service. When the MBMS service session, having the preferred frequency, is ended in step 411, the BM-SC 404 sends a session stop message to the SGSN 403 in step 421.

The session stop message includes a service identifier (ID) and a session ID. The service ID identifies the MBMS service, and the session ID identifies the MBMS service session. When the session stop message is sent from the BM-SC 404 to a low-level core network (CN), the BM-SC 404 makes notification of time information in the session stop message, which indicates a duration time required until the next service session is started. That is, the session stop message including the time information is sent to the SGSN 403 in step 421 and the SGSN 403 sends the session stop message to the CRNC 402 in step 422.

In step 431, upon receiving the session stop message, the CRNC 402 determines whether to send an LDI in accordance with the time information received from the session stop message. If a determination is made that the next session is started within a relatively short time in accordance with the received time information, the CRNC 402 does not signal the LDI to prevent the UEs 401 from being dispersed to different frequencies in step 441.b. At this time, a session stop message is sent, which does not include an LDI. When the UEs receive the session stop message of step 441.b, the UEs conform to a cell movement procedure defined in an existing Release 99 without being dispersed to different frequencies.

If a determination is made that the next session is started after a sufficiently long time in step 431, the CRNC 402 includes an LDI in the session stop message and sends the session stop message to disperse the UEs 401 to different frequencies in step 441.a. The UEs perform an operation for dispersion to the different frequencies upon receiving the session stop message with the LDI. The operation for dispersion to the different frequencies conforms to a specially defined mechanism, or re-selects a cell associated with the maximum radio strength.

Figure 5:
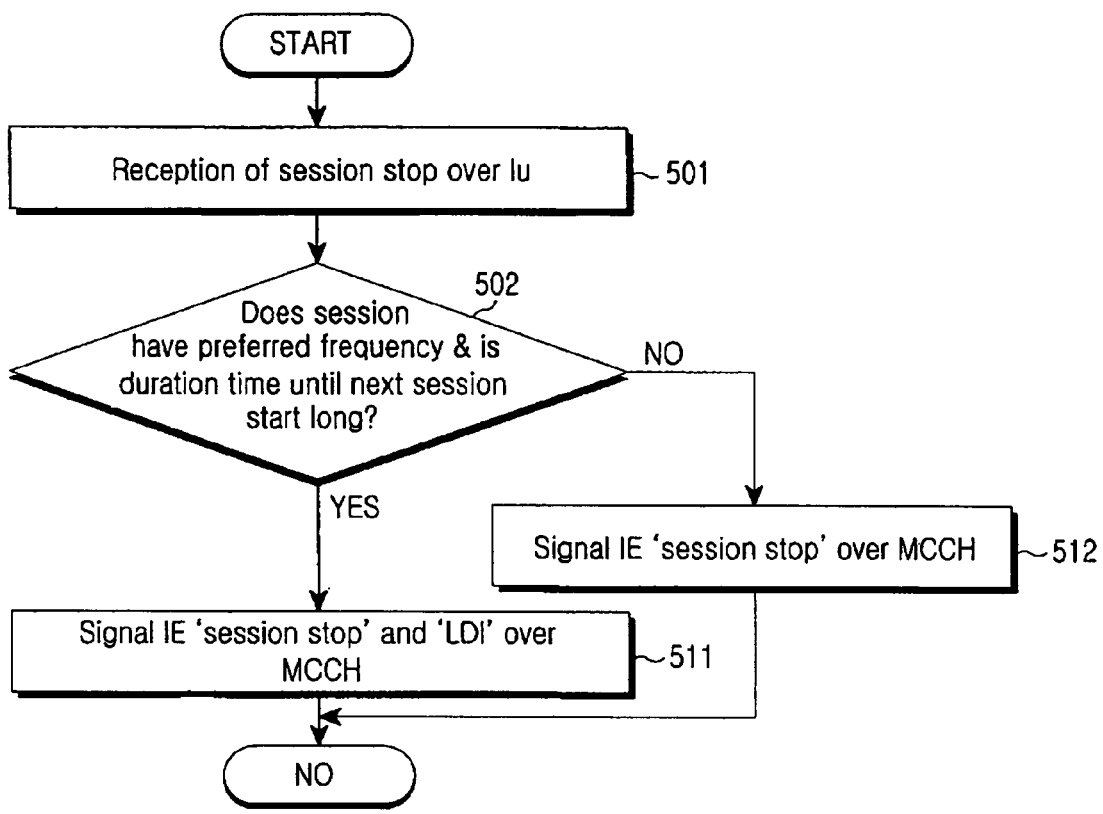
FIG. 5 illustrates an operation of a controlling radio network controller (CRNC) in accordance with an exemplary embodiment of the present invention.

FIG. 5 is a flowchart illustrating an operation of the CRNC in accordance with an exemplary implementation of FIG. 4.

In step 501, the CRNC receives a session stop message from the SGSN over an Iu interface. In step 502, the CRNC determines if the session stop message is associated with an MBMS service session having a preferred frequency, and a duration time, required until the next session is started, is sufficiently long by referring to time information included in the session stop message. For example, if the duration time, required until the next session is started, is more than a predefined threshold value, that is, if the session stop message is associated with the MBMS service session having the preferred frequency and the duration time, required until the next session is started, is sufficiently long, as a determination result of step 502, the CRNC proceeds to step 511 to include an LDI in the session stop message and sends the session stop message to the UEs of the preferred frequency over an MCCH.

However, if the session is not an MBMS service session having a preferred frequency or the duration time, required until the next session is started, is relatively short, as a determination result of step 502, the CRNC proceeds to step 512 to send a session stop message to the UEs over the MCCH. At this time, an LDI is not included in the session stop message.

Many exemplary implementations can be provided in a method for signaling an LDI. In one implementation, an LDI set to "True" is sent when the UEs need to be dispersed to different frequencies in FIG. 5. When measurement and cell re-selection methods for the UEs are performed, as defined in the existing Release 99, without dispersing the UEs to different frequencies, an LDI is not sent.

In another implementation, an LDI set to "True" can be sent when the UEs need to be dispersed to different frequencies. Also, an LDI set to "False" can be sent when the UEs do not need to be dispersed to different frequencies.

Table 1 shows an exemplary implementation of information regarding a time, required until the next session is started, which can be sent in a session stop message in steps 421 and 422 of FIG. 4 and step 501 of FIG. 5.

TABLE 1

| Info element (IE)/Group Name | Range | IE type and reference | Semantics description |
| --- | --- | --- | --- |
| MBMS duration time until the next session start | | | |
| >Seconds | | INTEGER (0 ... 86399) | The value represents the estimated duration time in seconds until the next session start corresponding to the MBMS service. |
| >Days | | INTEGER (1 ... 8) | The value represents the number of days in addition to the duration in seconds of the duration time until the next session start corresponding to the MBMS service. |

In Table 1, the duration time, required until the next session is started, is defined in seconds and days. Only the time information shown in Table 1 corresponds to an exemplary implementation, and a range of transmission information can be modified.

Table 2 shows another exemplary implementation of information regarding a time, required until the next session is started, which can be sent in a session stop message in steps 421 and 422 of FIG. 4 and step 501 of FIG. 5.

TABLE 2

| IE/Group Name | Range | IE type and reference | Semantics description |
|---|---|---|---|
| MBMS duration time until the next session start | | Integer (0 . . . 1023) | If this IE is not present, it means duration time until the next session start is longer than 1,024 seconds. |

If time information indicating the duration time required until the next session is started is not included in the session stop message, then the duration time required until the next session is started, exceeds a predetermined value, for example, 1,024 seconds, as shown in Table 2. However, if the time information is included in the session stop message, the information regarding the time, required until the next session is started, is signaled in a unit of seconds, as shown in Table 2. Only the time information shown in Table 2 corresponds to an exemplary implementation, and a range of transmission information can be modified.

Table 3 shows yet another exemplary implementation of information regarding a time, required until the next session is started, which can be sent through a session stop message in steps 421 and 422 of FIG. 4 and step 501 of FIG. 5.

TABLE 3

| IE/Group Name | Range | IE type and reference | Semantics description |
|---|---|---|---|
| MBMS duration time until the next session start | | Integer (0 . . . 1023) | The value represents the estimated duration time in seconds until the next session start by step2 seconds. If this IE is not present, it means duration time until the next session start is longer than 2,048 seconds. |

As shown in Table 3, an interval between two integers is recognized as 2 seconds rather than 1 second, and double time is given in accordance with a signaling amount as shown in Table 2. For example, the integers "0", "1", and "2" comprise 2 seconds, 4 seconds, and 6 seconds, respectively. Table 3 shows an example in which signaling overhead is reduced using a predefined interval, but a longer time interval is indicated. Only the interval of 2 seconds between two integers corresponds to an exemplary implementation. The interval between two integers can use a different value. A unit of time may be a unit of minutes or hours rather than seconds.

As is apparent from the above description, exemplary embodiments of the present invention have the following representative effects.

The exemplary embodiments of the present invention can reduce power consumption and improve the efficiency of a mobile communication system by determining whether to disperse user equipments (UEs) staying at a preferred frequency to different frequencies when a controlling radio network controller (CRNC) receives information about a time, required until the next session is started, and by preventing measurement, cell re-selection, and uplink/downlink signaling from being unnecessarily performed in the UEs.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for dispersing user equipments (UEs) to non-preferred frequencies in a multimedia broadcast/multicast service (MBMS) system, the method comprising the steps of:
   receiving, by a radio network controller (RNC), information regarding a time required until a next session of an MBMS service is started from a serving GPRS support node (SGSN);
   determining, by a RNC, whether to set a layer dispersion indicator (LDI) in a session stop message according to the received time information; and
   sending, by a RNC, the session stop message to UEs,
   wherein the LDI is used for dispersing, to different frequencies, UEs in a preferred frequency, and
   wherein the LDI is set depending on whether the MBMS has the preferred frequency and whether the time required until the next session is started exceeds a threshold value.

2. The method of claim 1, wherein the determining further comprising;
   setting the LDI in the session stop message and sending the session stop message to UEs that receive the MBMS service, when the MBMS service has the preferred frequency and the time, required until the next session is started, exceeds the threshold value; and
   sending the session stop message, in which the LDI is not set, to the UEs for receiving the MBMS service, when the MBMS service does not have the preferred frequency, or the time, required until the next session is started, is less than or equal to the threshold value.

3. The method of claim 1, wherein the session stop message comprises a service identifier (ID) for identifying the MBMS service and a session ID for identifying a session of the MBMS service.

4. The method of claim 1, wherein the LDI is set to "True" and sent in the session stop message, when the MBMS service has the preferred frequency and the time, required until the next session is started, exceeds a threshold value.

5. The method of claim 1, wherein the LDI is set to "False" and sent in the session stop message, when the MBMS service does not have the preferred frequency or the time, required until the next session is started, is less than or equal to the threshold value.

6. The method of claim 1, wherein the information regarding the time, required until the next session is started, comprises a unit of seconds or days.

7. The method of claim 6, wherein the information regarding the time, required until the next session is started, exceeds a predefined time range when the information is not comprised in the session stop message.

8. The method of claim 1, wherein the information, regarding the time, required until the next session is started, comprises a predefined unit of time within a predefined time range.

9. The method of claim 7, wherein the predefined unit of time comprises a unit of seconds, minutes, or hours.

10. An apparatus for dispersing user equipments (UEs) to non-preferred frequencies in a multimedia broadcast/multicast service (MBMS) system, the apparatus comprising:

a broadcast multicast service center (BM-SC) for providing an MBMS service, including information regarding a time required until a next session of the MBMS service is started, in a first message, when a session of the MBMS service is ended, and sending the first message over a specific interface; and a radio network controller (RNC) for controlling a plurality of cells, receiving the first message from a serving GPRS support node (SGSN), when the MBMS service has a preferred frequency and detecting information regarding the time, required until the next session is started determining whether to set a layer dispersion indicator (LDI) in a session stop message according to the detected information, and sending the session stop message to UEs for receiving the MBMS service, wherein the LDI is used for dispersing, to different frequencies, UEs in a preferred frequency, and wherein the LDI is set depending on whether the MBMS has the preferred frequency and whether the time required until the next session is started exceeds a threshold value.

11. The apparatus of claim 10, wherein the a radio network controller (RNC) controls a plurality of cells, receiving a first session stop message, setting the LDI in a second session stop message, sending the second session stop message to UEs for receiving the MBMS service when the MBMS service has the preferred frequency and the time, required until the next session is started, exceeds the threshold value, and sending the second session stop message in which the LDI is not set, to the UEs for receiving the MBMS service when the MBMS service does not have the preferred frequency or the time, required until the next session is started, is less than or equal to the threshold value.

12. The apparatus of claim 10, wherein the session stop message comprises a service identifier (ID) for identifying the MBMS service and a session ID for identifying the session.

13. The apparatus of claim 10, wherein the LDI is set to "True" and sent in the session stop message, when the MBMS service has the preferred frequency and the time, required until the next session, is started exceeds a threshold value.

14. The apparatus of claim 10, wherein the LDI is set to "False" and sent in the session stop message, when the MBMS service does not have the preferred frequency or the time, required unit the next session, is started is less than or equal to the threshold value.

15. The apparatus of claim 10, wherein the information regarding the time, required until the next session is started, comprises a unit of seconds or days.

16. The apparatus of claim 15, wherein the information regarding the time, required until the next session is started, exceeds a predefined time range when the information is not comprised in the session stop message.

17. The apparatus of claim 10, wherein the information regarding the time, required until the next session is started, comprises a predefined unit of time within a predefined time range.

18. The apparatus of claim 17, wherein the predefined unit of time comprises a unit of seconds, minutes, or hours.

* * * * *